Figure 1:
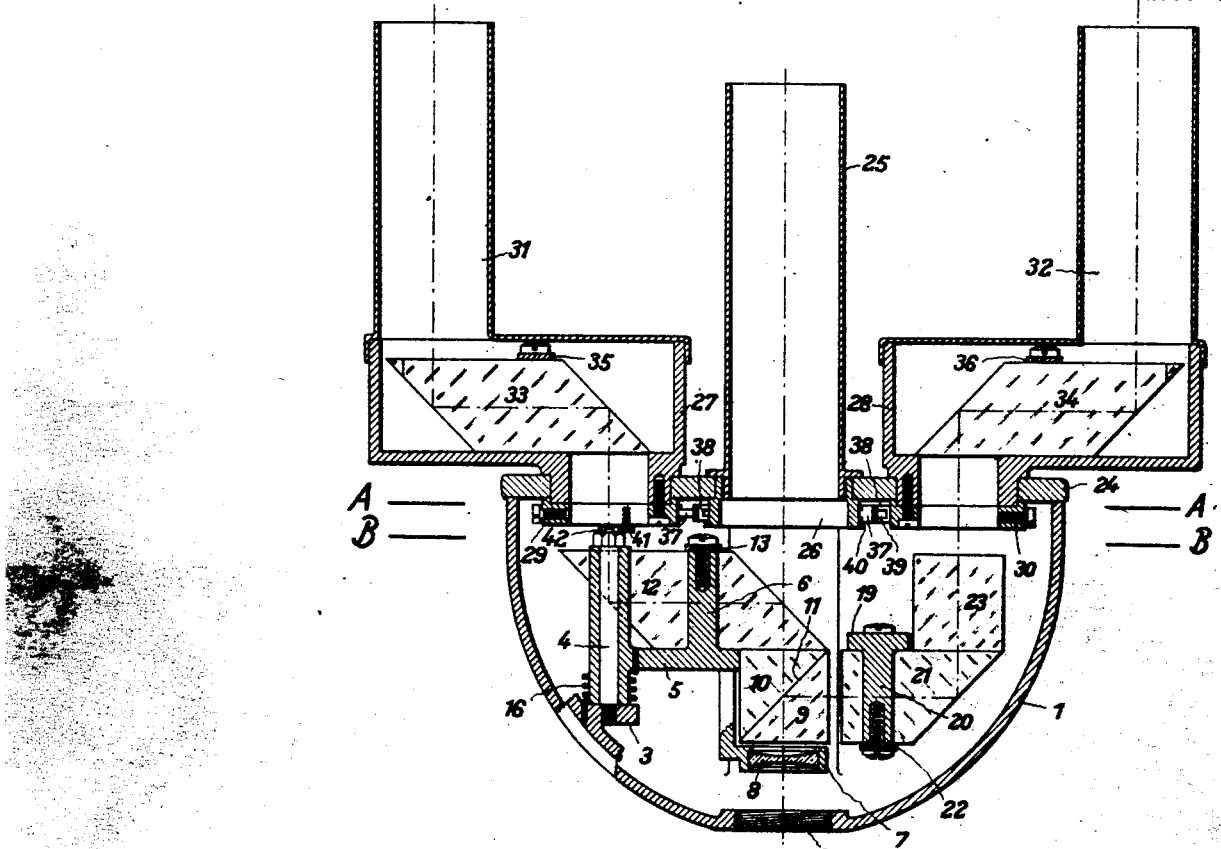

June 2, 1931.  W. BAUERSFELD ET AL  1,807,613
MICROSCOPE TUBE
Filed June 10, 1929  2 Sheets-Sheet 1

Inventors:
Walther Bauersfeld
Max Lichtschmann

June 2, 1931.  W. BAUERSFELD ET AL  1,807,613
MICROSCOPE TUBE
Filed June 10, 1929    2 Sheets-Sheet 2

Inventors:
Walther Bauersfeld.
Max Hirschmann.

Patented June 2, 1931

1,807,613

UNITED STATES PATENT OFFICE

WALTHER BAUERSFELD AND MAX HÜBSCHMANN, OF JENA, GERMANY, ASSIGNORS TO THE FIRM: CARL ZEISS, OF JENA, GERMANY

MICROSCOPE TUBE

Application filed June 10, 1929, Serial No. 369,775, and in Germany June 16, 1928.

The problem how to effect in quick succession microscopic examinations with one and with both eyes has been solved in different ways which, however, are not quite satisfactory. Exchanging a monocular microscope tube for a binocular one arranged on the same stand, is too troublesome and requires too much time. The application of one of the two eyepieces of a binocular tube for one eye only is not convenient because of the unsymmetric arrangement, whereas turning in and out a monocular and, respectively, a binocular eyepiece in order to apply them in conjunction with a tube for both kinds of examination is very often not desired and this for the reason that the work of focussing the object another time is entailed or, when examining with one eye only, the quality of the image is not equal to that of an image obtained with an ordinary monocular microscope, because of the usual longer glass paths for compensation of the tube lengths in the path of the imaging rays.

The invention has for its object a new solution of the problem and concerns a microscope tube with a system for dividing the rays, that allows the two kinds of examination to be effected in quick succession. This microscope tube is fitted with three eyepiece tubes of which, when in operative position, two are symmetric to a plane containing the axis of the third eyepiece tube. With such microscope tube the said disadvantages can be avoided when, according to the invention, it is given such a construction that of the eyepiece tubes at least one is movably and at least one rigidly connected to the microscope tube.

There are different possibilities how to effect the object of the invention. That execution which, however, has proved a special advantage is the one where the eyepiece tube for monocular use is rigidly connected with the microscope tube. Accordingly, this eyepiece tube keeps its position also during the time the other two eyepiece tubes for binocular use are applied, whereas, for monocular use, the two latter are moved away from their operative position in order to have them out of the way for the microscopist when he is applying the eyepiece tube for monocular use. The movement of the eyepiece tubes conveniently is a turning movement round axes at either finite or infinite distances from the axes of the eyepiece tubes, viz. where either turning or shifting in one direction is possible, whereby the movements of course also may be combined ones. With regard to the arrangement of the eyepiece tubes on the microscope tube there are four different possibilities: All eyepiece tubes can have a position parallel or oblique to the microscope tube or either the eyepiece tube for monocular use can be made oblique and the two other eyepiece tubes for binocular use parallel to the microscope tube or vice versa. Moreover, in case all three of the eyepiece tubes are made to be oblique to the microscope tube, the angles of inclination of the eyepiece tubes for mono- and binocular use can be made equal or different in size.

When applying the microscope for monocular use it is desired to obtain a miscroscopic image of the same high quality as is produced by a corresponding miscroscope that is made for the said kind of examination only, and, therefore, one has to avoid a difference in the optic lengths of the tubes, which would require additional glass ways to be inserted in the path of the imaging rays, and the tube must be adapted to the length of the tubes that ordinarily are used. This means, however, that the system for dividing the rays, that necessarily has to be inserted for binocular examination, must be taken out of the path of the imaging rays when changing to the other kind of examination. Now, therefore, the new microscope tube can be so constructed that the said insertion is independent of the changing of the eyepiece tubes and consequently, a special touch of the hand is required, whereas, when the system for dividing the rays is to be used, it is convenient to have it connected to one of the movable eyepiece tubes in such a way that, when the respective eyepiece tube is turned away from position for use, the said system is moved out of the path of the imaging rays. The movement of the said ray dividing system again can be round an axis at finite or infinite distance, i. e. it can be a turning movement or a shifting in straight direction.

In order to always maintain the symmetry of the eyepiece tubes, the two movable eyepieces for binocular use may be connected with each other by means of a coupling. With high quality microscopes the said two eyepieces may be made adjustable for suiting the distance between the pupils of the eyes of the microscopist, which means that the distance from one eyepiece tube to the other may be easily varied while in use. The manipulation is most simple when those parts of the eyepieces which are next to the eyes can be turned to suit the distance of the pupils and this round axes that are parallel to the axes of the said parts and at the same time coincide with the axes of the movements of the eyepiece tubes when being turned out of position for use (when changing from binocular to monocular observation).

The drawings represent a microscope tube according to the invention, for both kinds of examination, which can be applied on the usual microscope stands. Fig. 1 is a longitudinal central section through the new tube, Fig. 2 a diagram of the tube as seen from above, Figures 3 and 4 diagrammatically represent sections through the tubes along the lines A—A and B—B of Fig. 1.

The tube has a housing body 1 which is provided in the usual manner with a thread 2 for holding an objective or an objective interchanging device. In the front part of the housing body 1 a connecting piece 3 is provided. In this connecting piece 3 there is screwed a bolt 4 which is the turning axis of a prism support 5. The prism support 5 is provided with two pins 6, which serve for holding the prisms, and a frame 7 of a negative lens 8. Behind the negative lens 8 there is arranged a system for dividing the rays of light, which consists of two right-angled isosceles prisms 9 and 10 with semi-transparently silver-plated surfaces 11. This system is cemented to a prism 12 of parallelogrammatic cross-section, which is held in position on the prism support 5 by means of a prism holder 13 fixed on the pins 6. The travel of the prism support 5 is limited in front and behind by stops 14 and 15 respectively, which stops are screwed in the housing body 1, and a spiral spring 16 continuously presses the prism support 5 against the stop 14. The housing body 1 is provided with another two connecting pieces, 17 and 18, having screwed on a second prism holder 19 on which, between two pins 20, by means of a prism holder 22, a prism 21 with trapeziform cross-section is attached. In order to have equal paths for the pencils of partial rays parted in the dividing system 9, 10, there is cemented on the prism 21 a glass block 23.

Above, the housing body 1 is provided with a cover plate 24. In this cover plate 24 there is attached by means of a ring 26, which is screwed on from below, an eyepiece tube 25 that is on one axis with the thread 2, and, by internally threaded rings 29 and, respectively, 30, which also are screwed on from below, of two other eyepiece tubes the base parts 27 and 28 respectively, which can be turned and are of box-like shape above. The upper parts 31, 32 of the said other two eyepiece tubes serve at the same time as covers for the base parts 27, 28. In the base parts 27, 28, prisms 33 and 34 respectively, which have a parallelogrammatic cross-section, are attached by means of prism holders 35 and 36 respectively. The two rings 29 and 30 are coupled with each other by means of two steel ribbons, 37 and 38, which have the shape of an S. Where the two steel ribbons, 37 and 38, cross each other, the ribbon 37 is made narrower in order to go through a slit 39 in the ribbon 38. Both ribbons, 37 and 38, glide on the ring 26 which for such purpose is provided with a rim 40 that prevents them from slipping off to one side.

Moreover, the two eyepiece tubes for binocular use are coupled with the ray dividing system 9, 10 and the parts connected therewith, and this by means of a pin 42 whereof the upper end serving for the coupling is made broader and which is inserted in a sleeve 43 cast on the prism support 5. The microscope tube is provided in the usual manner with a slide 44 allowing it to be movably attached to the microscope stand.

Figure 2:
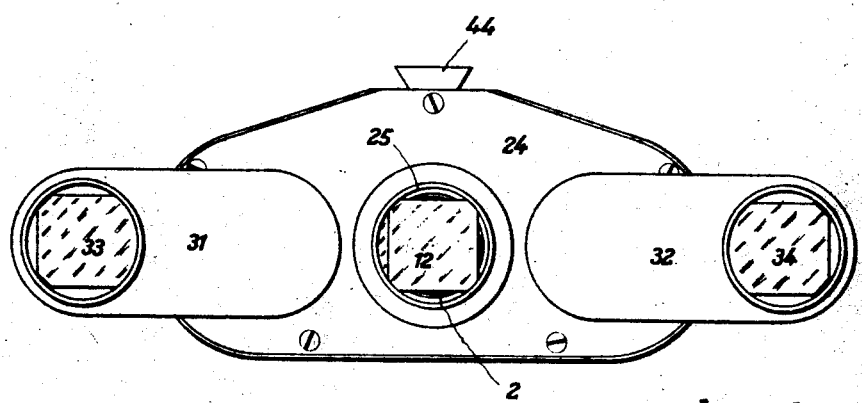
Figure 3:
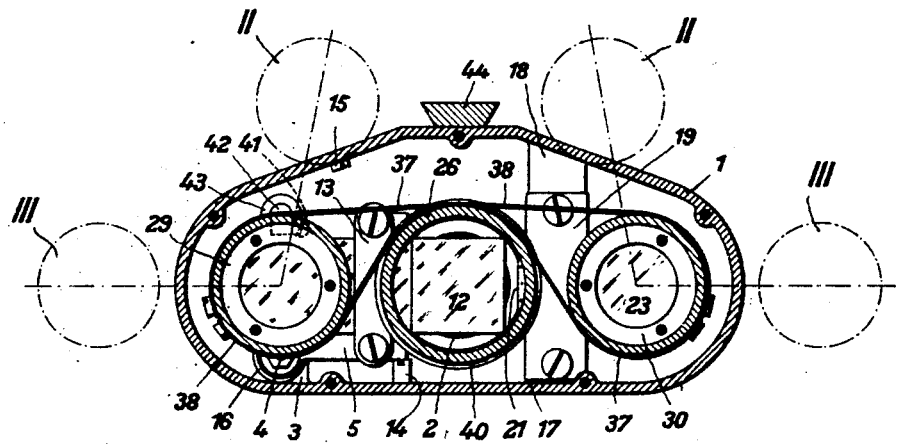
Figure 4:
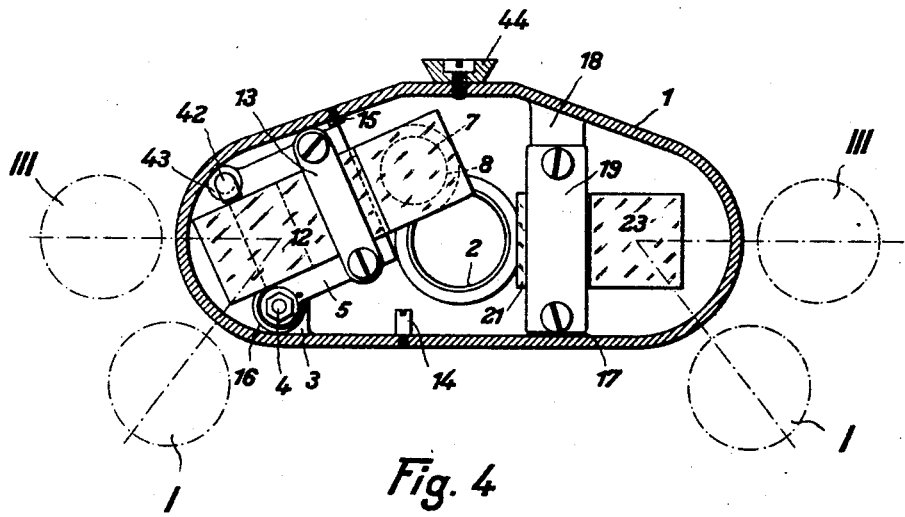

In Figures 3 and 4 the position of the upper parts 31, 32, as represented in Figures 1 and 2, is indicated by dot-and-dash circles III. When in position for use, these upper parts are at II (Fig. 3), when not, i. e. when the eyepiece tube for monocular observation, 25, is applied, they are at I (Fig. 4). The position II indicates the shortest possible distance between the pupils of a microcopist. Any other position between II and III, where, due to the spatial separation of the stop screw 41 from the pin 42, which is caused by the spring 16, the prism support 5 still touches the stop 14, is suitable also for binocular examination, and the tubes 31, 32 may be adjusted by the microscopist to suit the distance between his pupils. When changing from mono- to binocular examination, the upper parts 31, 32 are turned over position III to position I. The touching of the screw 41 with the bolt 42, which is effective between III and I, causes the prism support 5 to be turned in the position represented by Fig. 4, where the prism support 5 touches the stop 15 and the imaging rays can freely pass through the thread 2 into the eyepiece tube 25. Here the length of the tube is in correspondence with the length of the tube of the usual microscopes. In consequence of the increase of the length, which is caused by the two-fold lateral deflection of the pencils of partial rays in the prisms 12, 33 and 9, 21, 34 when the new microscope tube is applied for binocular use, a negative lens 8 is to be applied in order to have answered the demand to avoid a re-adjustment of the tube with respect to the object to be examined, when changing from one kind of observation to the other. The said negative lens 8 displaces the plane of the objective image so far that the usual eyepieces can be used in the eyepiece tubes 31, 32 without any difficulty.

We claim:

1. A microscope tube containing a housing body having an aperture for the insertion of an objective, one monocular and two binocular eyepiece tubes, of the three eyepiece tubes at least one being rigidly and at least one movably connected with the casing, and a ray dividing system comprising one light entrance surface and two light exit surfaces, the said system being pivotally mounted in the casing to turn out of an operative position into an inoperative one, in the operative position the said light entrance surface being situated behind the said aperture and the said two light exit surfaces in front of the said two binocular eyepiece tubes.

2. A microscope tube containing a housing body having an aperture for the insertion of an objective, one monocular and two binocular eyepiece tubes, of the three eyepiece tubes the eyepiece tube for monocular use being rigidly and the two others movably connected with the casing, and a ray dividing system comprising one light entrance surface and two light exit surfaces, the said system being pivotally mounted in the casing to turn out of an operative position into an inoperative one, in the operative position the said light entrance surface being situated behind the said aperture and the said two light exit surfaces in front of the said two binocular eyepiece tubes.

3. A microscope tube containing a housing body having an aperture for the insertion of an objective, one monocular and two binocular eyepiece tubes, of the three eyepiece tubes the eyepiece tube for monocular use being rigidly and the two others movably connected with the casing, a ray dividing system comprising one light entrance surface and two light exit surfaces, the said system being pivotally mounted in the casing to turn out of an operative position into an inoperative one, in the operative position the said light entrance surface being situated behind the said aperture and the said two light exit surfaces in front of the said two binocular eyepiece tubes, and means for coupling the ray dividing system with at least one of the binocular eyepiece tubes, the system and the tube, which are connected by the said coupling means being simultanenously in their inoperative positions.

WALTHER BAUERSFELD.
MAX HÜBSCHMANN.